United States Patent [19]
Campbell

[11] 3,843,613
[45] Oct. 22, 1974

[54] BRANCHED-CHAIN HYDROCARBON ELASTOMERS

[75] Inventor: John B. Campbell, Hockessin, Del.

[73] Assignee: E. I. du Pont de Nemours and Company, Wilmington, Del.

[22] Filed: Apr. 17, 1972

[21] Appl. No.: 244,866

Related U.S. Application Data

[60] Division of Ser. No. 38,862, May 19, 1970, abandoned, which is a continuation-in-part of Ser. No. 625,598, March 24, 1967, abandoned.

[52] U.S. Cl............ 260/78.5 BB, 260/27 BB, 260/78.5 HC, 260/80.78
[51] Int. Cl............................. C08f 15/40
[58] Field of Search............ 260/80.81, 80.78, 78.5

[56] References Cited
UNITED STATES PATENTS

| | | | |
|---|---|---|---|
| 2,706,721 | 4/1955 | Caldwell | 260/78.5 B |
| 2,933,480 | 4/1960 | Gresham | 260/80.78 |
| 3,038,887 | 6/1962 | Caldwell et al. | 260/78.5 B |
| 3,312,675 | 4/1967 | Caldwell | 260/80.81 |
| 3,553,256 | 1/1971 | Dissen | 260/78.5 B |
| 3,554,988 | 1/1971 | Emoe | 260/79.5 |
| 3,723,399 | 3/1973 | Amiard | 260/80.73 |

Primary Examiner—Joseph L. Schofer
Assistant Examiner—Edward J. Smith

[57] ABSTRACT

The incorporation of a $C_{20}$–$C_{62}$ di-ester of 2-(hydroxyalkyl or alkenyl)-5-norbornene in EPDM elastomer produces chain branching, with a consequent improvement in properties such as cold-flow of the uncured stock, and improved ozone resistance of natural rubber blends.

4 Claims, No Drawings

BRANCHED-CHAIN HYDROCARBON ELASTOMERS

CROSS-REFERENCE TO RELATED APPLICATIONS

This application is a division of application Ser. No. 38,862, filed May 19,1970, now abandoned, which, in turn, is a continuation in part of application Ser. No. 625,598, filed Mar. 24, 1967, now abandoned.

BACKGROUND OF THE INVENTION

This invention relates to sulfur-vulcanizable, chain-saturated elastomeric, α-olefin copolymers having improved cold-flow. More particularly this invention relates to improving the ozone resistance of blends of chain-unsaturated diene polymers with sulfur vulcanizable, chain-saturated, elastomeric α-olefin copolymers by the introduction of a controlled amount of chain branching into the α-olefin copolymer.

Among the polymers of the aliphatic olefins that are made by use of coordination complex compounds of the transition metals as polymerization initiators, the amorphous copolymers of ethylene with higher alpha-monoolefins constitute an important class because of their desirable elastomeric character and their generally excellent resistance to ozone and other chemicals. The chemical inertness of these polymers is attributed to the fact that the linear chain or "backbone" is a completely saturated structure without the reactive double bonds of the common elastomeric materials such as natural rubber or the synthetic elastomers made from conjugated diolefins. This chemical inertness made the early polyolefin elastomers, namely amorphous ethylene-propylene copolymers, impossible to vulcanize with the sulfur systems preferred in the rubber industry. This problem was solved by incorporating as third monomers, non-conjugated diolefins containing both a readily polymerizable and a relatively non-polymerizable double bond, thus forming an elastomeric polymer consisting of a linear saturated backbone having pendant unsaturated hydrocarbon groups capable of participating in crosslinking reactions with sulfur curing systems. The use of non-conjugated aliphatic diolefins such as 1,4-hexadiene and 6-methyl-1,5-heptadiene as the third monomer in hydrocarbon elastomers of this sort is taught, for instance, in U.S. Pat. No. 2,933,480, and the use of bridged ring diolefins having double bonds of unequal reactivity is similarly taught in U.S. Pat. No. 3,211,709.

It is the nature of coordination complex polymerization of olefin hydrocarbons to form practically linear, unbranched polymer chains. While a strictly linear polymer structure is adantageous in the stiff, crystalline polyolefins used as thermoplastic molding materials, such as polyethylene an polypropylene, it is not necessarily so in amorphous polyolefins that are used as elastomers. As a matter of fact, it has been found that strictly linear polyolefin elastomers show relatively undesirable cold-flow properties unless the polymer has an especially broad distribution of molecular weights. For example, the undesirable cold-flow properties cause the elastomer to rupture bags in which they are packaged during storage. However, such a distribution of molecular weights causes undesirably high viscosity of dilute solutions of the polymer in the solvents employed in their manufacture and use.

DESCRIPTION OF THE INVENTION

The present invention provides sulfur curable chain-saturated branched elastomers comprising a. from 25 to 75 percent by weight of ethylene units, b. units derived from a $C_{20}$–$C_{62}$ di-ester of 2-(hydroxyalkyl or alkenyl)-5-norbornene, said di-ester units being present in an amount resulting from the addition to the reaction mixture from which said copolymer is formed of about 0.01 – 0.10 gram mole per kilogram of copolymer formed of said $C_{20}$–$C_{62}$ di-ester, the amount of di-ester not to exceed 15 percent by weight of the copolymer, and c. sufficient units of a nonconjugated diolefin containing only one polymerizable double bond to provide 0.1 to 4.0 gram mole/kilogram of polymer of carbon-carbon double bonds derived from the diolefin containing one readily polymerizable double bond; and d. the remainder of said polymers being propylene units, said polymers being prepared by an organo-soluble coordination catalyst.

The present invention also provides a sulfur curable ozone resistant composition consisting essentially of about 10 to 30 parts by weight of the copolymer of this invention and about 90 to 70 parts by weight of a polyunsaturated elastomer.

A used herein, the term "consisting essentially of" has its generally accepted meaning as requiring that specified components be present, but not excluding unspecified components which do not materially detract from the basic and novel characteristics of the composition as disclosed.

Methods for carrying out the polymerization of olefin hydrocarbons with coordination complex catalysts are well known in the art. See, for instance, "Linear and Stereoregular Addition Polymers," by Gaylord and Mark, Interscience Publishers, New York, 1959. Among the most useful catalyst systems for making elastomeric copolyolefins are those based on soluble compounds of vanadium such as vanadium oxytrichloride, vanadium tetrachloride, vanadium tris-(acetylacetonate), etc., used in conjunction with organoaluminum compounds such as aluminum alkyls (e.g., triisobutyl aluminum), and alkyl aluminum halides (e.g., diisobutyl aluminum chloride), and so on. It is preferable that a halogen be present on at least one of the catalyst components. Many variations and refinements of these catalyst systems are now well known in the art. The particular organo-soluble catalyst system used is not critical to the practice of this invention as long as it is capable of forming practically amorphous copolymers of olefin hydrocarbons.

A variety of solvents can be employed with the catalyst. Among the most useful are tetrachloroethylene, and aliphatic hydrocarbons such as hexane. Other solvents will be apparent to those skilled in the art.

Methods for copolymerizing ethylene and propylene to form amorphous polymers that have the basic characteristics of a synthetic rubber are well known in the art. The principle of making such polymers vulcanizable with sulfur curing systems by introducing as a third polymerizable monomer a multiolefin having only one polymerizable double bond is also known. Polymerizable double bonds in coordination polymerization systems are generally found to be unhindered terminal double bonds in aliphatic olefins, or double bonds in strained ring cycloaliphatic compounds, such as cycloaliphatic compounds having one- or two-carbon bridged ring structures. Double bonds that are found not to be readily polymerizable are generally the internal, i.e., non-terminal double bonds of aliphatic olefins, sterically hindered double bonds of aliphatic olefins such as those carrying a methyl group or other substituent on one of the doubly bonded carbon atoms, and double bonds in relatively unstrained cycloaliphatic rings. Typical non-conjugated diolefins containing only one polymerizable double bond that are suitable in copolymers of this invention are 1,4-hexadiene, 2-methyl-1,5-hexadiene, 1,9-octadecadiene, 6-methyl-1,5-heptadiene, 7-methyl-1,6-octadiene, 11-ethyl-1,11-tridecadiene, and the like. Typical cycloaliphatic compounds that can serve the same purpose include dicyclopentadiene, tricyclopentadiene, 5-ethylidene-2-norbornene, 5-methylene-2-norbornene, alkenyl substituted norbornenes having an internal double bond in the alkenyl group (e.g., 5-(2'-butenyl)-2-norbornene), unsaturated derivatives of bicyclo (2,2,2)-octane, and so on. The use of such compounds to provide pendant sulfur-reactive unsaturated structures on an amorphous polyolefin is well known in the art.

Amorphous copolyolefins including ethylene, propylene, and one or more of the above-mentioned diolefins made by the prior art methods are mainly straight-chain polymers and have the disadvantages already mentioned.

A desirable ramification, i.e., chain branching, can be introduced into polymers of the general class by including a carefully selected proportion of a fourth monomer that has two polymerizable double bonds. As used herein, the term "polymerizable double bond" is meant the double bonds in strained ring cycloaliphatic structures. Suitable monomers may contain, two strained ring double bonds.

Compounds suitable for incorporation as the fourth component are $C_{20}$–$C_{62}$ di-esters of 2-(hydroxyalkyl or alkenyl)-5-norbornene. About 0.01–0.10 gram mole of the di-ester per kilogram of copolymer is preferred. The amount of the di-ester should preferably not exceed 15 percent by weight of the copolymer. The di-esters useful in practicing this invention are conveniently prepared by reacting an acid with the Diels-Alder adduct of an alkyl or alkenyl alcohol and cyclopentadiene. For example, a preferred di-ester is prepared by reacting adipic acid with the Diels-Alder adduct of allyl alcohol and cyclopentadiene. The di-ester formed is bis-cyclol adipate and is represented by the formula:

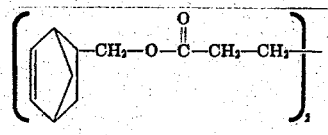

(Di-ester of adipic acid and 5-norbornene-2-methanol.)

The acid can be a dicarboxylic acid, saturated or unsaturated, aliphatic, or phthalic acid, terephthalic acid, or isophthalic acid. The alcohol can be a $C_1$–$C_6$ alkyl or alkenyl alcohol. Allyl alcohol is preferred.

When esters, ethers, or any monomer containing a hetero-atom, such as oxygen, sulfur or nitrogen, are present during polymerization, it is preferable to complex the hetero atom to facilitate polymerization. This is conveniently accomplished by using an excess amount of organoaluminum compound in the coordination catalyst system as will be apparent to those skilled in the art.

Analysis of the amount of monomer having two polymerizable double bonds incorporated in the polymer has in some cases proved difficult. The proportions described herein and in the following examples are the proportions employed in the synthesis. During the synthesis, it is preferred that the conversion of the diolefin containing only one polymerizable double bond be at least 20 percent. Also, it is preferred that the conversion of the polyolefin containing two polymerizable double bonds be at least 20 percent; as conversion is increased, a smaller amount of the polyolefin is required to obtain the desired branching.

The branched copolymers of the present invention consist essentially of a linear chains or "backbones" with branching along the chains. These branched copolymers differ from previously known EPDM copolymers having a practically linear structure. Chain branching is demonstrated by the fact that the copolymers of this invention have physical properties substantially different than those of practically linear copolymers, such as known EPDM copolymers. The properties of the copolymer used to detect branching are the solution (inherent) viscosity and bulk viscosity as indicated by the Wallace plasticity. For example, the inherent viscosity and Wallace plasticity of a practically linear copolymer and a branched copolymer are measured as described in the following examples. The results are compared, and the branched copolymer shows a greater rate of change in Wallace plasticity than the rate of change in inherent viscosity. Thus, for a given inherent viscosity, the Wallace plasticity is greater for the branched than for the unbranched copolymer.

Mooney viscosity is measured at 121°C. in accordance with ASTM Method D-1646-67 using the large rotor. After the sample has been warmed in the machine for one minute, the shearing disc viscometer motor is started to begin the test. Four minutes later the reported viscosity reading is taken.

Wallace plasticity is a measure of the amount of flow or deformation of unvulcanized elastomeric materials under load. The sample to be tested is sheeted and cut into pellets having a thickness in the range 3.18–6.35 mm (0.125–0.300 inch). The test is performed with a Wallace plastimeter manufactured by H. W. Wallace and Co., Ltd., London. During a 10-second period the pellet is simultaneously compressed to exactly 1.0 mm in thickness and heated to 100°C., the resulting test piece is then subjected to a 10 kg. load for exactly 15 seconds at 100°C. The final thickness of the test piece, expressed in units of 0.01 mm, is the plasticity value reported. The standard 1-cm diameter platen is suitable for pellets of average hardness. Proper platen temperature regulation is most important because elastomer plasticity is usually temperature dependent. Plasticity readings should normally fall between 20 and 90 on the scale for most reliable readings.

The elastomeric products of the present invention can be processed with conventional rubber processing equipment in the same way as other sulfur curable α-olefin based elastomers, particularly those elastomers having a broad molecular weight distribution.

Conventional compounding ingredients such as carbon black, mineral fillers, coloring agents, extending oils and the like are generally incorporated into the polymers.

Various curing systems can be employed, as will be apparent to those skilled in the art. The most important of these curing systems is the sulfur curing system which is applicable to all of the polymers within the scope of this invention. Other curing systems include quinoid curing systems, phenolic curing systems and peroxide curing systems.

The polymers of the present invention have improved cold flow resistance when isolated, compared with elastomers having the same proportions of ingredients and made with the same catalyst but omitting the modifying amount of diolefin containing two polymerizable double bonds. The above improvement is indicated by the increased Wallace Plasticity. As shown in the examples, the Wallace Plasticity of the products can be substantially increased without any substantial increase in solution viscosity.

This invention is further illustrated by the following specific examples. All parts, proportions, and percentages are by weight unless otherwise indicated.

Propylene content is determined from the infrared absorption spectrum, and 1,4-hexadiene content is determined from the infrared absorption spectrum or by bromine absorption. Inherent viscosity is determined on a 0.1 percent solution of the polymer in tetrachloroethylene at 30°C.

EXAMPLE 1

BCA Containing Tetrapolymer

The polymerization is carried out continuously in a 1.2 liter stainless steel, liquid-full reactor maintained at a pressure of 100 psig. The following feed rates are established: ethylene, 2.31 gram-moles per hour, propylene, 4.59 gram-moles per hour; 1,4-hexadiene, 0.41 gram-mole per hour; bis-cyclol adipate, 0.00375 gram-mole per hour; $VCl_4$, 2.08 millimoles per hour; diisobutylaluminum chloride, 24.0 millimoles per hour; and hexane, 2.165 liters per hour.

The average residence time is thirty minutes. The reactor temperature is maintained at 30°C. by external cooling. Polymer is produced at an average rate of 96.55 grams per hour. The reactor effluent is discharged into a flasher where unreacted ethylene and propylene are allowed to evaporate at atmospheric pressure. The residual polymer solution is then mixed with a solution of 4,4'-thio-bis(3-methyl-6-tert-butylphenol) in an isopropanol-hexane mixture (1:8 by volume) before catalyst residues are removed with dilute acetic acid and water washes. Hexane is removed by evaporation on a drum drier. The isolated tetrapolymer has the following monomer unit composition: 1.4 percent bis-cyclo adipate, 38.1 percent propylene, 4.4 percent 1,4-hexadiene, and 56.1 percent ethylene (by weight). The inherent viscosity of the polymer is 1.98 (measured at 30°C. on a solution of 0.1 gram of tetrapolymer in 100 ml. of tetrachloroethylene). The Mooney viscosity is 40.5 (ML-1+4 at 250°F). The Wallace plasticity is 29.

The branched-chain elastomeric copolymers of this invention have been found to be especially useful in blends with polyunsaturated elastomers such as natural rubber and the synthetic diene elastomers. It is known in the art that the EPM and EPDM elastomers confer a measure of ozone resistance on such blends, but it has surprisingly been found that the branched-chain tetrapolymers of this invention are much more effective than the prior art terpolymers, as illustrated by the following Experiments.

EXAMPLE A

A masterbatch was prepared in a Farrel "Midget Banbury Mixer" (having a 250 ml. void) by combining 20 grams of the tetrapolymer of Example 1, 50 grams of natural rubber, 30 grams of neoprene, type W. 3.5 grams of zink oxide, 25 grams of FEF carbon Black, and 3.0 grams of Circosol Light Oil.* Then the following curing ingredients consisting of 0.5 gram of 2,2'-dithiobisbenzothiozole, 0.35 gram of diphenylguanidine, 2.0 grams of stearic acid and 1.3 gram of sulfur were added at about 50°C. on a 4 × 8 inch rubber mill. Slabs, made from the resulting stock, were cured for 15 minutes at 320°F. between "Mylar" polyester sheets. Dumbells were cut with a die and clamped in the "Dynamat" attachment in a chamber at 40°C. where the ozone concentration was maintained at 0.5 ppm and the samples were flexed for a period of up to 24 hours.

*Naphthenic petroleum oil

The tetrapolymer of Example 1 imparted good ozone resistance to the blends, whereas a control blend substituting a tripolymer of ethylene, propylene and 1,4-hexadiene (made by a similar process) for the tetrapolymer displayed poor ozone resistance.

EXAMPLE B

Ozone Resistance of Natural Rubber-Neoprene BCA containing Tetrapolymer (50-30-20) Blends.

The tetrapolymer of Example 1 was compounded, vulcanized and tested as described in Example B above. The ozone resistance of the blend is good whereas a control blend substituting a tripolymer of ethylene, propylene, and 1,4-hexadiene (made by a similar process) for the tetrapolymer displays poor ozone resistance.

The branched-chain elastomeric copolymers of this invention have been found to be especially useful in blends with polyunsaturated elastomers, such as natural rubber, and the synthetic diene elastomers. Particularly useful are styrene/butadiene elastomers (e.g., SBR containing 23.5 percent styrene by weight), polybutadiene, and butadiene/acrylonitrile, (e.g. NBR having 20–45 percent acrylonitrile). Natural rubber, styrene/butadiene, and polybutadiene are preferred.

I claim:

1. A sulfur curable chain saturated branched elastomer comprising a copolymer of a. from 25 to 75 percent by weight of ethylene units, b. units derived from a $C_{20}$–$C_{62}$ di-ester of 2-(hydroxyalkyl or alkenyl)-5-norbornene, said di-ester units being present in an amount resulting from the addition to the reaction mixture from which said copolymer is formed of about from 0.01–0.10 gram mole per kilogram of copolymer formed of said $C_{20}$–$C_{62}$ di-ester, the amount of di-ester not exceeding 15 percent by weight of the copolymer, c. sufficient units of a nonconjugated diolefin containing only one polymerizable double bond selected from the group consisting of (1) an aliphatic diolefin, and (2) a cycloaliphatic compound having a one- or two-carbon bridged ring structure to provide 0.1 to 4.0 gram moles/kilogram of carbon-carbon double bonds derived from the diolefin, and d. the remainder of said copolymer being propylene units.

2. Composition of claim 1 wherein di-ester (b) is represented by the formula

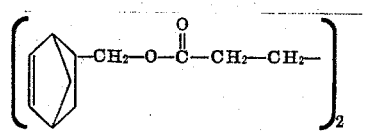

3. Composition of claim 2 wherein the diolefin (c) is 1,4-hexadiene.

4. A sulfur curable chain saturated branched elastomer comprising a copolymer of a. from 25 to 75 percent by weight of ethylene units, b. units derived from a $C_{20}$–$C_{62}$ di-ester of 2-hydroxyalkyl-5-norbornene, said di-ester units being present in an amount resulting from the addition to the reaction mixture from which said copolymer is formed of about from 0.01–0.10 gram mole per kilogram of copolymer formed of said $C_{20}$–$C_{62}$ di-ester, the amount of di-ester not exceeding 15 percent by weight of the copolymer, c. sufficient units of a nonconjugated diolefin containing only one polymerizable double bond selected from the group consisting of (1) an aliphatic diolefin, and (2) a cycloaliphatic compound having a one- or two-carbon bridged ring structure to provide 0.1 to 4.0 gram moles/kilogram of carbon-carbon double bonds derived from the diolefin, and d. the remainder of said copolymer being propylene units.

* * * * *